Figures 1, 2:
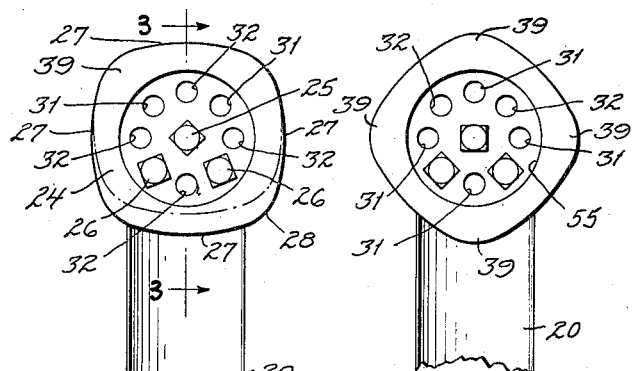

Jan. 23, 1940.  A. W. BOLLARD  2,187,897

MIXER TOOTH

Filed Feb. 4, 1938

INVENTOR.
ARTHUR W. BOLLARD
BY Bates, Goldrick, & Teare
ATTORNEYS

Patented Jan. 23, 1940

2,187,897

UNITED STATES PATENT OFFICE 2,187,897

MIXER TOOTH

Arthur W. Bollard, Cleveland, Ohio, assignor to The F. D. Cummer & Son Company, Cleveland, Ohio, a corporation of Ohio Application February 4, 1938, Serial No. 188,719

9 Claims. (Cl. 259—178)

This invention relates to an improved mixer tooth or blade, and especially to a mixer tooth and tip therefor, which is adapted for use in mixing machines, such as those used for mixing crushed rock or other aggregates with asphalt or other bituminous materials, for the construction of highway flooring and the like. Generally, these mixers are of the twin pug mill type and are provided with a number of mixing blades or teeth so arranged as to mix materials thoroughly, coating all particles of the aggregate with bituminen. Such a mixer is illustrated in Patent No. 1,741,013, issued December 24, 1929, to Frederick H. Cummer.

In mixers of the type with which this invention is concerned, the mixer blades or teeth, and especially the tips of such teeth, are subjected to extreme wear by abrasion, and therefore require more or less frequent replacement, even though they be made of special wear-resisting metal, such as manganese or other alloyed steel. In some instances these blades have been provided with removable tips to permit replacement of the tips when they become worn. The wearing away of the end of the tip increases the clearance between the ends thereof and the mixer shell to such an extent as to limit the efficiency of the mixer. The replacement of mixer teeth or the replacement of tips requires a considerable length of time causing a delay or interruption of operations of the mixer, and the maintenance of an extra supply of teeth for replacement purposes, all of which increase the cost of preparation of bituminous paving materials. This is especially true as to resist wear, the teeth or the tips therefore are made of a comparatively expensive metal, which is difficult to work, particularly by cutting up operations, making it necessary to use great care in the initial forming of the teeth and tips so that they will be as near a finished form as is possible, thus increasing the manufacturing cost of these articles.

An object of the present invention is to provide an improved mixer tooth, the life of which will be materially increased in comparison with the life of mixers used in the past. I prefer to accomplish this object by providing a mixer tooth with a removable tip, which has a plurality of surfaces so arranged that the tip may be adjusted relative to the shank of the tooth to selectively position any one of such surfaces to form the end of the tooth. I further propose to so arrange the tip and shank that each of these surfaces may be used twice by moving the tip lengthwise relative to the shank.

The wearing away of the tooth not only shortens the tooth but bevels the end thereof, and I have found that when the tip is moved lengthwise relative to the shank, the angle of the face of the tip relative to the shank is changed. This is caused by the wear on the face of the tip. This effects the mixing qualities of the tooth. Hence, a further object of the present invention is to so arrange the tip and tooth that the angular relationship between the tip and the shank will be restored when the tip is moved lengthwise of the tooth. One way of accomplishing this is by providing a spherical seat for the tip and tooth, and I have found that this not only increases the effectiveness of the tip, when moved lengthwise of the tooth, but also increases the life of the tip.

In the production of asphalt or bituminous pavement, several different mixtures are used. These mixtures vary from each other in the size of the crushed rock or aggregate used. For instance, in some mixtures, a coarse aggregate is employed. Half of such aggregate may be of such size as would require a screen having openings from two to three inches square to permit the material to pass through. Such an aggregate is called coarse aggregate and is used as a base or foundation for a surface material later to be applied. On the other hand, a mixture such as that employed in the surface material requires a comparatively fine aggregate, all of which would pass through a three-eighth inch mesh screen. Obviously, the mixture containing a coarse aggregate would not be effectively mixed by a tooth, designed for a mixture containing a fine aggregate.

In the past, two different types of mixer teeth or tips have been used. A somewhat pointed tooth or tip has been found most efficient for use with materials containing coarse aggregate, whereas a flat-nosed tooth or tip has been found most efficient for use in connection with materials containing fine aggregate. Hence, when a mixer had been used for materials containing a coarse aggregate, and it was desired to mix materials containing fine aggregate, the mixer teeth or tips thereof were changed from pointed teeth to flat-nosed teeth. This required the maintenance of two sets of teeth for the mixer, one set for coarse aggregates and another set for fine aggregates. In addition, extra teeth for replacement purposes for both types were required, thus further increasing the cost of the equipment necessary for the production of bituminous paving materials.

An object of the present invention is to provide a mixer tooth to overcome the disadvantages set out above, and which will efficiently mix materials containing either coarse aggregates or fine aggregates. I prefer to accomplish this object by providing a mixer tooth having a plurality of surfaces which may be selectively positioned to become the working surface of the tooth, and which surfaces vary from each other, one surface being especially adapted for one type of material and another surface being especially adapted for another type of material, such, for instance, coarse and fine aggregates.

Another object of the present invention is to provide an adjustable mixer tooth which will have a plurality of surfaces arranged to be selectively positioned to form the ends of the mixer tooth, and wherein certain of these surfaces differ from others in that they are formed for the mixing of different types of materials, and wherein a plurality of each type of surface is provided, whereby the life of the tooth or tip may be materially prolonged.

Another object of the present invention is the provision of a tip for a mixer tooth, which tip may be readily applied to existing mixer teeth with a minimum amount of labor and, when so applied, may be used in a number of positions so as to prolong the life of the tip and/or enable the effective mixing of various types or grades of material.

Other objects of this invention will become more apparent from the following description, reference being had to the accompanying drawing in which I illustrate a preferred embodiment of the invention. The essential features of the invention will be summarized in the claims.

Figure 3:
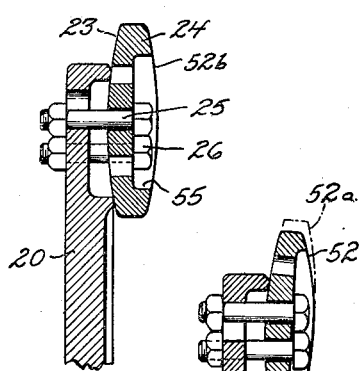
Figure 4:
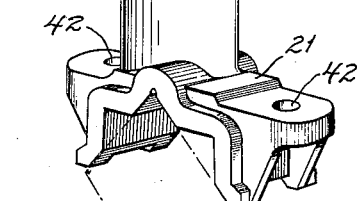
Figure 6:
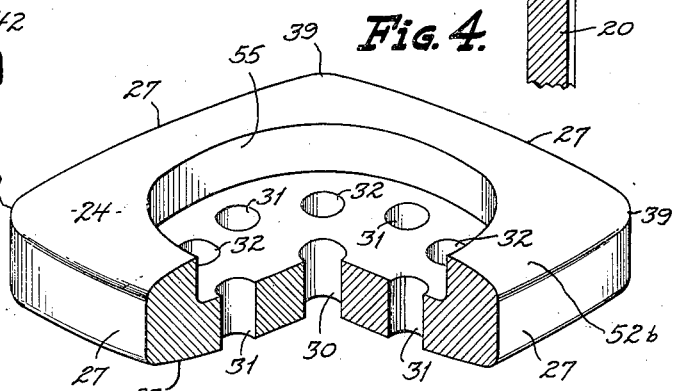
Figure 5:
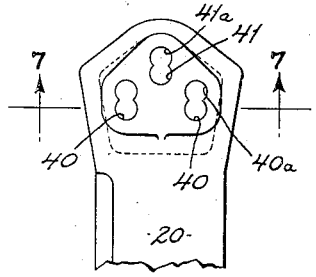
Figure 7:
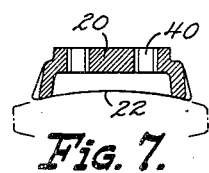
Figure 8:
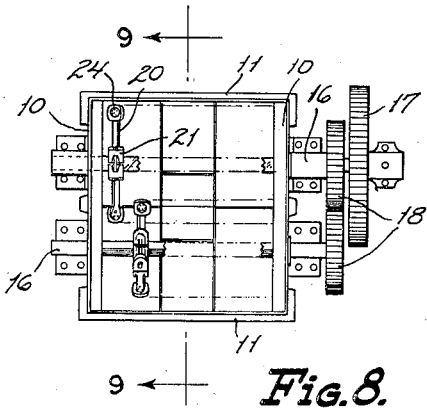
Figure 9:
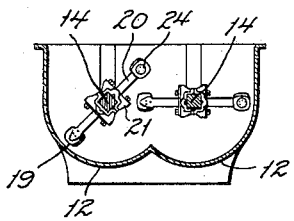

In the drawing, Fig. 1 is a perspective view of a mixer tooth and tip made according to my invention; Fig. 2 is a fragmentary view of the tooth shown in Fig. 1, illustrating the tip in a different position; Fig. 3 is a fragmentary vertical section as shown by the line 3—3 on Fig. 1; Fig. 4 is a fragmentary vertical section, similar to Fig. 3, but illustrating the tip in a different position relative to the tooth; Fig. 5 is a view similar to Fig. 2, but illustrating the tooth with the tip removed; Fig. 6 is a perspective view of the tip, certain portions being broken away to more clearly illustrate its contour; Fig. 7 is a sectional view, as indicated by the line 7—7 on Fig. 5; Fig. 8 is a more or less diagrammatic illustration, being a plan view of a mixer illustrating the use of the mixer teeth; Fig. 9 is a sectional view, of the mixer, as indicated by the line 9—9 on Fig. 8.

As heretofore mentioned, the mixer tooth with which the present invention is concerned, is especially well adapted for use in pug mill type mixers, such as that shown in Patent No. 1,741,013, heretofore mentioned, and reference may be had to such patent for a more complete description of the mixer. Briefly, such a mixer may comprise, as shown in Figs. 8 and 9, a box-like shell, having parallel spaced end walls 10 joined by substantially vertical side walls 11, which curve downwardly and inwardly and thence upwardly forming the bottom of the mixer which comprises two cylindrical portions around the axis of the mixer shafts 14. The shafts 14 extend through the end walls of the mixer and are supported by bearings 16. One of the mixer shafts is driven by a gear 17, to which power is applied in any suitable manner. Drivingly secured to such shaft is a second gear 18, which meshes with a similar gear 18 on the other mixer shaft, thereby driving the shafts and the teeth carried thereby in opposite directions.

The mixer teeth are arranged in pairs on the shafts 14, one tooth being positioned opposite the other, as indicated in Figs. 8 and 9, in such a manner so that the shanks of the teeth extend radially from the shafts, the tips reaching toward the cylindrical portions 12 of the mixer, so that consequent upon the rotation of the shaft the material is mixed in a manner common with pug mills, the tips of the mixer teeth moving the material adjacent the bottom of the mixer. Thus, it will be seen that it is important to maintain the length of the teeth above a predetermined minimum length, inasmuch as when the tooth becomes shortened by wear, the space indicated at 19 in Fig. 9, between the end of the mixer tooth and the bottom of the mixer shell, is increased to such an extent as to permit the shell to become coated with materials which will not be engaged by the tooth, thereby preventing a thorough mixing of such materials, as well as reducing the capacity of the mixer.

In Fig. 8, I have shown two pairs of mixer teeth, however, it is to be understood that the shafts 14 support teeth throughout their entire length, as indicated by the dotted lines.

A mixer blade or tooth made in accord with this invention is illustrated in detail in Figs. 1 to 7, inclusive. As there shown, such mixer tooth comprises a blade or shank 20, having a shaft-engaging boss 21 at one end. This boss is provided with openings 22, to permit the teeth to be clamped together in pairs in embracing relation to the mixer shaft, as shown in Figs. 8 and 9. The shaft-engaging bosses 21 are so arranged that the teeth may be set square with the shaft, as shown in Fig. 9, or diagonally as indicated by the shaft indicated by the dotted lines 14a in Fig. 1. At least one face of the shank, adjacent the end opposite the shaft engaging boss 21, is provided with a spherical seat 22, adapted to engage a correspondingly spherical surface 23 of a removable and adjustable tip 24. This tip 24 is secured to the end of the shank 20 by bolts 25 and 26.

The tip with which this invention is especially concerned comprises a substantially rectangular block of metal, the four edges 27 of which are slightly convex, and the corners rounded, as at 28. This tip is provided with a central opening 30, to receive the bolt 25, and a plurality of openings 31, arranged in a circle about the opening 30, and which receive the bolts 26. The arrangement of the seat 22 and the openings 31 is such that the tip may be rotated through an angle of ninety degrees relative to the shank 20, thus positioning any one of four edges 27 at the outermost end of the mixer tooth. Thus, it will be seen that the surfaces 27 may be selectively positioned to form the end of the mixer tooth. These surfaces are substantially flat, and are the type generally used for mixing materials containing fine aggregate.

The mixer tooth and the tip is also arranged so as to bring any one of the corners 39 of the tip, selectively into position to form the end of the tooth, as indicated in Fig. 2. For this purpose, the tip is provided with a series of openings 32, which are disposed between the openings 31, to receive the bolts 26. These openings 32 are so arranged that any one of the four corners may be positioned to form the end of the mixer tooth. Thus a plurality of pointed tooth surfaces are provided which may be brought into play selectively whereby materials containing fine aggregates may be readily mixed.

As heretofore mentioned, the mixer tip is so arranged that it may be moved lengthwise of the mixer shank, so as to increase the overall length of the tip and shank, thus permitting each surface 27 or 39 to be utilized twice.

To this end, the mixer shank is provided with one set of openings 40 and 41, to receive the bolts 26 and 25 respectively, when the mixer tooth is new. However, after a surface has become worn so that the end of the tooth has been shortened the tip is moved lengthwise of the shank 20, from the position illustrated in full lines in Fig. 1 to the dotted line position there indicated. To this end, a second set of openings 40a and 41a are provided. These openings are so arranged that when the bolts 25 and 26 are positioned therein, the mixer tip will have been moved lengthwise of the shank to increase the overall length of the tip and shank and thus compensate for the decrease due to wear. The heads of the bolts 25 and 26 lie within the recess 55 formed in the face of the tips and are therefore relieved to a great extent of the abrasive action of the materials being mixed.

It will be noted from Fig. 4 that as the tip is moved lengthwise of the shank, to compensate for wear, the face 52 of the tip, despite the fact that it has been worn away as indicated by comparison with the dotted lines 52a, assumes substantially the same position relative to the shank 20 as the original surface 52b (Fig. 3) assumed when the tip was initially applied to the shank. This is due to the spherical seat between the tip and the shank.

While in the foregoing description I have described a mixer tip as being a four-sided figure, it is obvious that it may be any multi-sided figure, as for instance triangular or hexagonal, the number of surfaces, of course, depending somewhat upon the size of the tooth. When the size of the tooth is increased, a greater number of surfaces may be had. Likewise, in the case of a pointed tooth the number of surfaces is somewhat dependent upon the sharpness of point desired.

Indeed it is within the spirit of the present invention to provide a tip having but two utilizable surfaces which may be spaced one hundred and eighty degrees from each other, and which may be either identical surfaces or surfaces of different mixing characteristics.

From the foregoing description it will be seen that I have provided a mixer tooth, having a tip which may be adjusted relative to its shank, both to increase the mixer overall length of the tip and shank, and thus compensate for wear on the end of the tip, and I have at the same time provided a plurality of tip surfaces, any one of which may be selectively positioned to form the end of the mixer tooth. Thus, I have provided a mixer tooth which will have a comparatively long and useful life. It will also be noted that certain of the surfaces of the tips which may be moved to form the end of the tooth have different configurations than other of such surfaces, thus providing a mixer tooth which may be readily adjusted for mixing various types of material. For instance, the tip shown in the drawing is arranged to mix material containing a fine and a coarse aggregate. By rotating the tip relative to the shank, the tip illustrated provides four wearing surfaces for the mixing of fine materials, and four wearing surfaces for the mixing of coarse materials, and by moving the tip lengthwise of the shank, each one of these eight surfaces may again be used, thus providing a total of sixteen wearing surfaces for the tip. Obviously, this material increases the life of the mixer tip. Likewise, it will be seen that the tip may be used to advantage on ordinary mixer teeth merely by providing the necessary openings in the tooth to receive the tip securing bolts.

I claim:

1. A mixer tooth of the class described, comprising a shank, a tip mounted on said shank and having a portion thereof projecting beyond the end of the shank, said tip having a plurality of surfaces of one surface-contour, any one of which surfaces may be moved into a projecting relation to the shank, said tip also being provided with a plurality of surfaces each having a different surface-contour than the first named surfaces, whereby when the length of the tip and shank becomes shortened due to wear, such length may be restored by moving another surface into a projecting relation, said tip also being movable lengthwise of the shank regardless of which surface is in a projecting position, whereby when any one of said projecting surfaces becomes shortened due to wear the overall length of the tip and shank may be restored by moving the tip lengthwise of the shank, and means to secure the tip in an adjustable position on said shank.

2. A mixer tooth of the class described, having a blade adapted and arranged to be secured to a rotatable member and extend substantially radially therefrom, a spherical seat formed in one face of said blade and adjacent the end thereof remote from the rotatable member, a mixer tip having a spherical surface adapted to coact with this spherical seat, said tip being movable lengthwise of the blade to a plurality of positions relative thereto, and means to secure said tip in position on said blade.

3. A mixer tooth of the class described, having a blade adapted and arranged to be secured to a rotatable member and extend substantially radially therefrom, a spherical seat formed in one face of said blade and adjacent the end thereof remote from the rotatable member, a mixer tip having a spherical surface adapted to coact with this spherical seat, said tip being movable lengthwise of the blade to a plurality of positions relative thereto, said tip also being movable about an axis extending normal to said blade, and means to secure said tip in position on said blade.

4. A tip for a mixer blade, said tip comprising a substantially rectangular member having a centrally located opening adapted to receive a member about which the tip may rotate, said tip also having a series of openings extending parallel with the central opening and spaced in a circle thereabout, one surface of said tip extending in a plane substantially normal to the axis of said openings and being substantially spherical in surface contour.

5. In a mixer tooth of the class described, having a shank, one face of said shank being provided with a spherical seat and an opposite substantially flat surface, a mixer tip having a spherical surface adapted to coact with said seat and an oppositely facing substantially flat surface, means passing through said shank and tip and engaging both of said flat surfaces to secure the tip in position on said shank whereby relative movement between the shank and tip acts to increase the distance between the flat surfaces and thus increase the tension on the securing means.

6. A mixer tooth of the class described comprising a substantially flat elongated shank provided with a plurality of parallel spaced rows of intersecting openings, a substantially flat tip having a substantially centrally located transversely extending opening, said tip also having a series of openings extending parallel with the central opening and spaced in a circle thereabout, whereby said tip may be secured to said shank by bolts extending through aligned openings, and rotated about the axis of the central opening in the tip to present different wearing areas of the tip into position to form the end of the tooth and whereby the tip may be moved outwardly to cause the central opening in the tip to align with various openings of one of said rows to increase the overall length of the tooth.

7. A mixer tooth of the class described comprising a blade having one end thereof adapted and arranged to be secured in position on a shaft with the blade extending radially therefrom, a tip mounted on the other end of the blade and movable about an axis at right angles to the axis of the blade and bearing against the face of said blade, said tip comprising a wear resisting member having a plurality of substantially flat edge surfaces the intersections of which provide substantially pointed corner surfaces, means to lock the tip in position so that either a substantially flat tip edge surface or a corner may be positioned to form the edge of the tooth as desired.

8. A mixer tooth of the class described, comprising a blade having one end thereof adapted and arranged to be secured in position on a shaft with the blade extending radially therefrom, a tip mounted on the other end of the blade and movable about an axis at right angles to the axis of the blade and bearing against the face of said blade, said tip comprising a wear resisting member having a plurality of intersecting edge surfaces, wherein the tip may be moved about its axis to predetermined positions to cause a selected edge surface to be positioned to form the end of the tooth or wherein the tip may be moved to an intermediate position to cause the intersection of two of said surfaces to be positioned to form the end of the tooth, and means to secure the tip in adjusted position.

9. A mixer tooth of the class described, comprising a blade having one end thereof adapted and arranged to be secured in position on a shaft with the blade extending radially therefrom, a tip mounted on the other end of the blade and movable about an axis at right angles to the axis of the blade and bearing against the face of said blade, said tip comprising a substantially flat wear resisting member of a substantially rectangular shape, having side edges joined by corners, whereby movement of the tip about its axis will move any selected rectangular side or corner surfaces to be positioned to form the end of the tooth, and wherein each of said edge surfaces extends radially outward beyond the outermost end of the blade to protect such end against wear when positioned to form the end of the tooth, and means to secure said tip in a plurality of adjusted positions.

ARTHUR W. BOLLARD.